(12) United States Patent
Yangourazov (10) Patent No.: US 10,977,599 B2
(45) Date of Patent: Apr. 13, 2021

(54) ONLINE SYSTEM FOR FACILITATING DELIVERY OF PACKAGES VIA DRONE DELIVERY

(71) Applicant: Albert Denn Yangourazov, New York, NY (US)

(72) Inventor: Albert Denn Yangourazov, New York, NY (US)

(*) Notice: Subject to any disclaimer, the term of this patent is extended or adjusted under 35 U.S.C. 154(b) by 0 days.

(21) Appl. No.: 16/986,236

(22) Filed: Aug. 5, 2020

(65) Prior Publication Data

US 2021/0056494 A1 Feb. 25, 2021

Related U.S. Application Data

(63) Continuation-in-part of application No. 16/546,754, filed on Aug. 21, 2019, now abandoned.

(51) Int. Cl.
*G06Q 10/08* (2012.01)
*G06Q 20/32* (2012.01)

(52) U.S. Cl.
CPC ......... *G06Q 10/083* (2013.01); *G06Q 20/325* (2013.01)

(58) Field of Classification Search
CPC ......... G06Q 10/08355; G06Q 10/0832; G06Q 20/102; G06Q 20/24
See application file for complete search history.

(56) References Cited

U.S. PATENT DOCUMENTS

| 7,853,481 | B1* | 12/2010 | Johnson | G06Q 30/0633 |
| | | | | 705/26.42 |
| 2012/0173448 | A1* | 7/2012 | Rademaker | G06Q 50/28 |
| | | | | 705/338 |
| 2017/0116570 | A1* | 4/2017 | Schroeder | G06Q 50/01 |
| 2017/0283057 | A1* | 10/2017 | Thompson | B64C 39/024 |

OTHER PUBLICATIONS

R. AlTawy, M. ElSheikh, A. M. Youssef and G. Gong, "Lelantos: A Blockchain-Based Anonymous Physical Delivery System," 2017 15th Annual Conference on Privacy, Security and Trust (PST), Calgary, AB, Canada, 2017, pp. 15-24 (Year: 2017).*

* cited by examiner

*Primary Examiner* — George Chen
*Assistant Examiner* — Wayne S. Murray
(74) *Attorney, Agent, or Firm* — Mark Terry (57) ABSTRACT

A networked system for facilitating package delivery services includes a recipient module executing on a recipient computing device for recording recipient delivery preference and electronic payment information for package delivery services, a host module executing on a host computing device for recording host location, host delivery ability, an email address and/or telephone number, and electronic payment information for receiving payment, and a web server for processing the electronic payment information for package delivery services with a payment gateway, searching the database among the plurality of host records for the particular host record having data that best matches the data transmitted by the recipient module, transmitting a unique anonymous identifier to the recipient and host, wherein the unique anonymous identifier corresponds to the delivery process, and delivering the package to the host location of the host, wherein the recipient must display the unique anonymous identifier to retrieve the package.

15 Claims, 6 Drawing Sheets

ONLINE SYSTEM FOR FACILITATING DELIVERY OF PACKAGES VIA DRONE DELIVERY

CROSS-REFERENCE TO RELATED APPLICATIONS

This application is a continuation in part of patent application Ser. No. 16/546,754 filed Aug. 21, 2019 and titled Online System for Facilitating Delivery of Packages." This application incorporates by reference the subject matter of patent application Ser. No. 16/546,754.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of electronic commerce and, more specifically, the claimed subject matter relates to the field of package delivery activities using computing devices.

BACKGROUND

Package delivery or parcel delivery is the delivery of packages, parcels, or high value mail as single shipments. The service is provided by most postal systems, express mail, private courier companies, and shipping carriers. Package delivery is an important part of U.S. commerce. Throughout a typical year, most U.S. consumers rely on the package delivery industry as their the main mode of receiving packages, parcels, or high value mail. The U.S. Department of Commerce estimates that in an average year, the package delivery industry enjoys over $60 billion in sales. When the value of the goods being delivered in an average year are considered, U.S. sales attributed to the package delivery industry amount to over a trillion U.S. dollars.

Conventionally, packages are delivered to the recipient at his home or his place of work, i.e., wherever the recipient specified when he ordered the goods. In more recent years, with the rise in popularity of the Internet, recipients are increasingly purchasing goods online and having the goods shipped to the recipient. A less common option is to have a third person, such as a family member or employee, purchase goods on behalf of a recipient and have it shipped to the recipient. Thus, a variety of ways exist for purchasing goods and having them shipped to the recipient.

One of the drawbacks associated with conventional package delivery activities involves the given location of the delivery of the package. Often, a recipient may not be present at his home or place of work when the package is delivered, and it may not be safe to leave the package at the door or on the porch due to theft or damage. In those cases, the delivery person may return to his headquarters with the package and have the recipient visit the headquarters to retrieve the package, which can be time-consuming and tedious for the recipient. In other cases, the recipient may not have a set place or location for the package to be delivered. In these cases, the recipient has no good alternatives for having the package delivered in a way that is convenient and efficient.

Another drawback associated with conventional package delivery activities involves the identity of the recipient of the package. Often, a recipient may purchase a good for delivery, and the good may be highly confidential (such as a legal document) or highly embarrassing (such as a sexual aid device). In those cases, the recipient may be weary of revealing his identity when retrieving the package. Displaying the recipient's identity, however, is often required when retrieving a package, such as from the U.S. Post Office.

Therefore, what is needed is a system and method for improving the problems with the prior art, and more particularly for a more expedient and efficient method and system for facilitating package delivery activities.

BRIEF SUMMARY

In one embodiment, a networked system for facilitating package delivery services is disclosed. The system comprises a recipient module executing on a recipient computing device communicably connected to a communications network, the recipient module, belonging to a recipient, configured for transmitting, over the communications network, to a web server the following data: recipient delivery preference and electronic payment information for package delivery services to the web server, wherein the recipient delivery preference indicates a host location, and a host module executing on a host computing device communicably connected to the communications network, the host module, belonging to a host, configured for transmitting, over the communications network, to the web server the following data: host location, host delivery ability, an email address and/or telephone number, and electronic payment information for receiving payment. The system further includes a database communicably connected to the communications network, the database including a plurality of user records and a plurality of user records, the database configured for storing the data transmitted by the recipient module in a particular user record, and storing the data transmitted by the host module in a particular host record, and a web server module executing on the web server communicably connected to the communications network, the web server module configured for reading the data transmitted by the recipient module, processing the electronic payment information for package delivery services with a payment gateway, over the communications network, searching the database among the plurality of host records for the particular host record having data that best matches the data transmitted by the recipient module, instantiating a delivery process for a package destined for the recipient, transmitting a unique anonymous identifier, over the communications network, to the recipient module on the recipient computing device and the host module on the host computing device, wherein the unique anonymous identifier corresponds to the delivery process, and directing the delivery process to deliver the package to the host location of the host, wherein the recipient must display the unique anonymous identifier to retrieve the package from the host at the host location.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

The disclosed embodiments improve upon the problems with the prior art by providing a system that allows a recipient to receive a package for delivery, without requiring that the recipient is present at his home or place of work. The recipient may purchase a good, such as a food item, or a piece of clothing, online using his computing device, which results in the recipient receiving the purchased good via package delivery to a location of his choosing. Therefore, the disclosed embodiments reduce or eliminate the need for the purchasing recipient to be present at the recipient's home or office in order to receive the package. This is advantageous for users, as it provides greater flexibility in package delivery activities and bridges the temporal and geographic gap that may exist between a recipient at a remote location and a good that he ordered. An additional benefit of the disclosed embodiments is that the anonymity of the recipient can be maintained during the package delivery process. The main benefit of the claimed subject matter is the improvement of the conventional package delivery experience. That is, receiving a package at a time and place of your choosing, is more personal, engaging and inviting than a conventional package delivery service. The claimed subject matter allows for the delivery of a package while maintaining the anonymity of the recipient and providing an efficient delivery experience.

Figure 1:
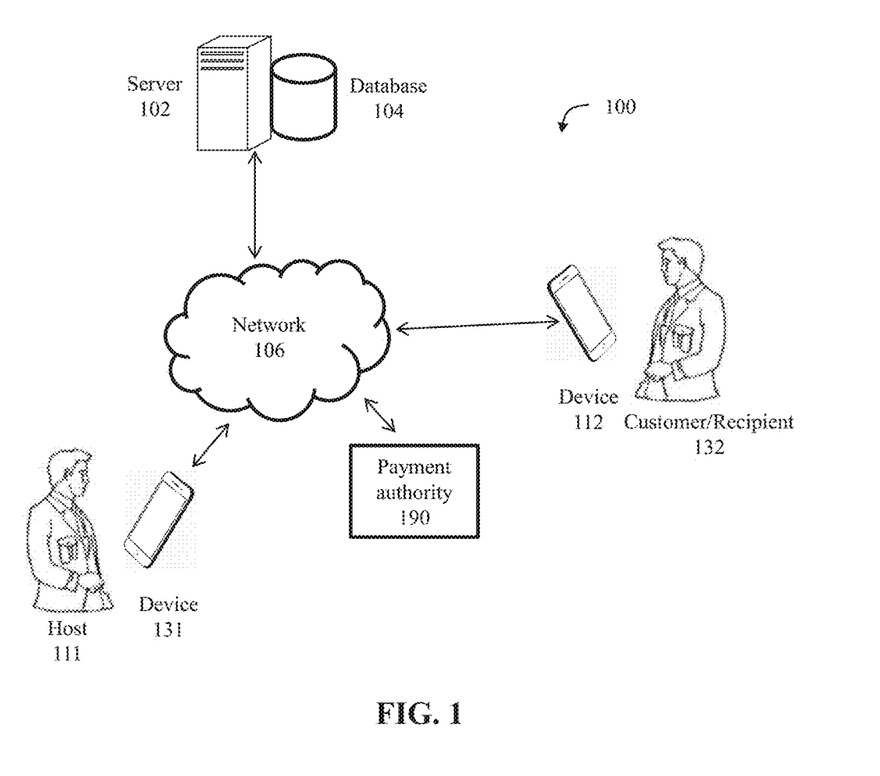
FIG. 1 is a block diagram illustrating the network architecture of a system for facilitating package delivery services over a communications network, in accordance with one embodiment.

Referring now to the drawing figures in which like reference designators refer to like elements, there is shown in FIG. 1 an illustration of a block diagram showing the network architecture of a system 100 and method for facilitating package delivery activities over a communications network in accordance with one embodiment. A prominent element of FIG. 1 is the server 102 associated with repository or database 104 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for functionality of the disclosed embodiments, namely, facilitating package delivery activities between users.

FIG. 1 includes mobile computing devices 131, 112, which may be smart phones, mobile phones, tablet computers, handheld computers, laptops, or the like. In another embodiment, mobile computing devices 131, 112 are workstations, desktop computers, servers, laptops, all-in-one computers, or the like. In another embodiment, mobile computing devices 131, 112 are AR or VR systems that may include display screens, headsets, heads up displays, helmet mounted display screens, tracking devices, tracking lighthouses or the like. Mobile computing device 112 corresponds to a customer 132 who may have purchased a good online and is waiting for a package to be delivered. Mobile computing device 131 corresponds to a host 111 who has contracted to deliver or hold a package for customer 132. Devices 102, 131, 112 may be communicatively coupled with network 106 in a wired or wireless fashion.

FIG. 1 further shows that server 102 includes a database or repository 104, which may be a relational database comprising a Structured Query Language (SQL) database stored in a SQL server. Devices 102, 131, 112 may also each include their own database. The repository 104 serves data from a database, which is a repository for data used by server 102 and devices 131, 112 during the course of operation of the disclosed embodiments. Database 104 may be distributed over one or more nodes or locations that are connected via network 106.

The database 104 may include a user record for each user or customer 132. A user record may include: contact/identifying information for the user (name, address, telephone number(s), email address, etc.), information pertaining to packages associated with the user, contact/identifying information for friends of the user, electronic payment information for the user, information pertaining to the purchases made by the user, sales transaction data associated with the user, etc. A user record may also include a unique identifier for each user, a residential address for each user, the current location of each user (based on location-based services from the user's mobile computer) and a description of past packages received by each user. A user record may further include demographic data for each user, such as age, sex, income data, race, color, marital status, etc. A user record may also include contact information (email address, name, address, telephone number, etc.) or a unique identifier for one or more friends or acquaintances of the user. A user record may also include data defined by the user, such as an asking price for the delivery, a type of package, the dates and times the package is needed for delivery, the rating of the host preferred, a rating of the recipient (as rated by other users) a delivery preference (whether at the recipient home/office, a third-party location specified by the recipient or the location of the host), a nickname, randomly generated name, or an automatically generated unique anonymous identifier (i.e., a unique alphanumeric or picture code that does not provide any identifying data about the recipient).

Sales transaction data may include one or more product/service identifiers (such as SKUs), one or more product/service amounts, buyer contact/identifying information, brick and mortar outlet information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

The database 104 may also include a host record for each host 111. A host record may include: contact/identifying information for the host (name, address, telephone number(s), email address, etc.), information pertaining to packages delivered or held by the host, contact/identifying information for friends of the host, electronic payment information for the host (for receiving payment for his services), information pertaining to the deliveries made by the host, sales transaction data associated with the host, etc. A host record may also include a unique identifier for each host, a residential address for each host, the current location of each host (based on location-based services from the host's mobile computer) and a description of past packages delivered by each host. A host record may further include demographic data for each host, such as age, sex, income data, race, color, marital status, etc. A host record may also include contact information (email address, name, address, telephone number, etc.) or a unique identifier for one or more friends or acquaintances of the host. A host record may also include data defined by the host, such as such as an asking price for a delivery, type of packages the host handles, the dates and times he hosts packages for delivery, the rating of the recipient preferred, a rating of the host (as rated by other users), a host delivery ability (whether at the recipient home/office, a third-party location specified by the recipient or the location of the host), a nickname, randomly generated name, or automatically generated unique anonymous identifier (i.e., a unique alphanumeric or picture code that does not provide any identifying data about the host).

FIG. 1 shows an embodiment wherein networked computing devices 131, 112 interact with server 102 and repository 104 over the network 106. It should be noted that although FIG. 1 shows only the networked computers 131, 112, and 102, the system of the disclosed embodiments supports any number of networked computing devices connected via network 106. Further, server 102, and units 131, 112 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although server 102 is shown as a single and independent entity, in one embodiment, the functions of server 102 may be integrated with another entity, such as one of the devices 131, 112. Further, server 102 and its functionality, according to a preferred embodiment, can be realized in a centralized fashion in one computer system or in a distributed fashion wherein different elements are spread across several interconnected computer systems.

FIG. 1 also shows a payment authority 190, which acts to effectuate payments by user 132 for goods, package delivery services, or the like. In the course of a sales transaction, server 102 may interface with payment authority 190 to effectuate payment. In one embodiment, the payment authority 190 is a payment gateway, which is an e-commerce Application Service Provider (ASP) service that authorizes and processes payments from one party to another. The payment authority 190 may accept payment via the use of purchase cards, i.e., credit cards, charge cards, bank cards, gift cards, account cards, etc.

Figure 2:
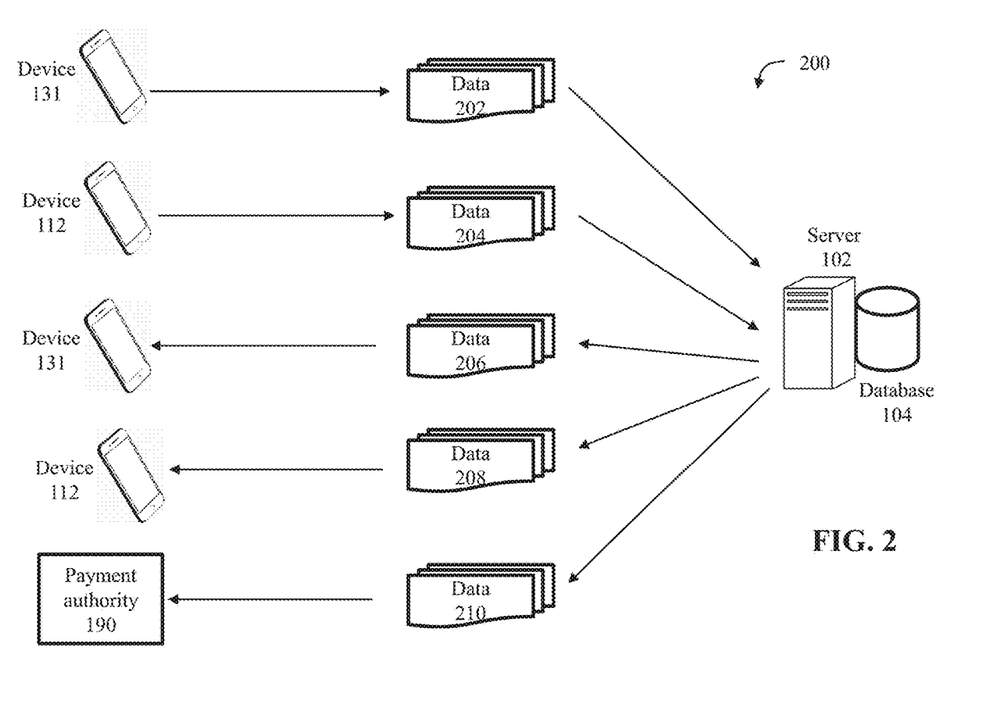
FIG. 2 is a block diagram showing the data flow of the process for package delivery services over a communications network, according to one embodiment.
Figure 3A:
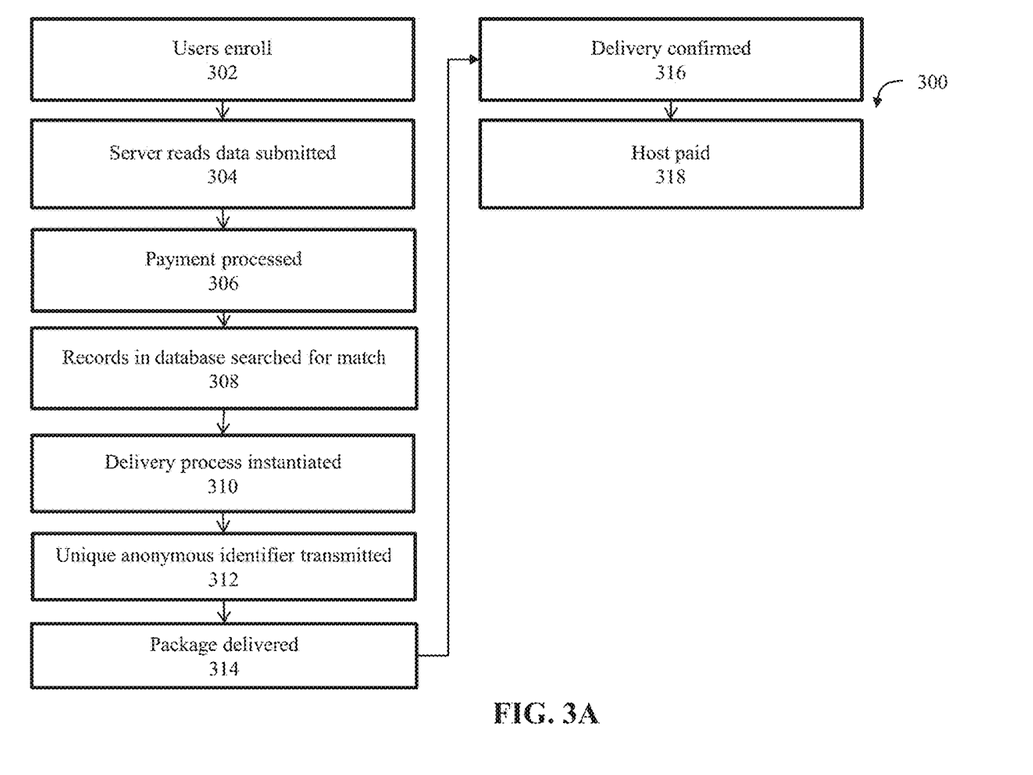
FIG. 3A is a flow chart depicting the general control flow of a process for facilitating package delivery services over a communications network, according to one embodiment.
Figure 3B:
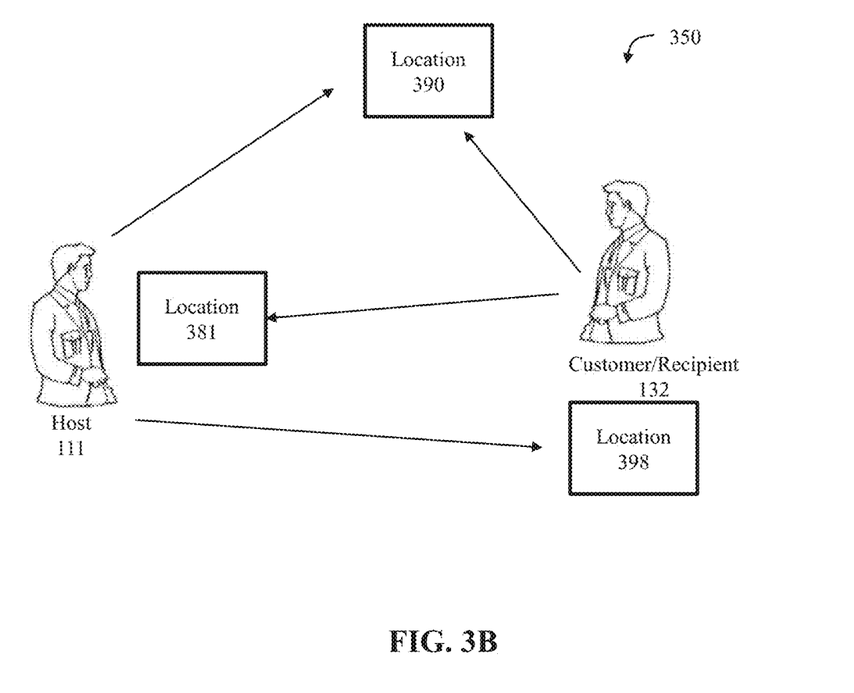
FIG. 3B is a block diagram depicting the different delivery location of the process for facilitating package delivery services over a communications network, according to one embodiment.

The package delivery services process over a communications network will now be described with reference to FIGS. 2, 3A and 3B below. FIG. 2 depicts the data flow 200 of the process for facilitating package delivery services over a communications network 106, while FIG. 3A depicts the control flow 300 of the process for facilitating package delivery services over a communications network 106, according to one embodiment. FIG. 3B is a block diagram 350 depicting the different delivery locations of the process for facilitating package delivery services over a communications network, according to one embodiment.

The process of the disclosed embodiments begins with optional step 302 (see flowchart 300), wherein the host 111 and recipient 132 may enroll or register with server 102. In the course of enrolling or registering, the users may enter data into their device by manually entering data into a mobile application via keypad, touchpad, or via voice. In the course of enrolling or registering, the recipient 132 may enter any data 204 that may be stored in a user record into his device 112, as defined above. In one embodiment, in the course of enrolling or registering, the recipient 132 does not enter any identifying data into his device 112, so as to maintain anonymity. In this embodiment, the recipient may enter non-identifying data, such as a unique identifier, but he does not enter any data that may identify him, such as his name, address, phone number, etc. The graphical user interface that accepts said data will prohibit the user from entering any identifying data into the interface. In one embodiment, the server 102 or the recipient module on the device 112 generates a unique and anonymous email address for the recipient 132, in order to avoid collecting identifying data about the recipient, such as his name, address, phone number or email address. The unique and anonymous email address is hosted by the server 102 and allows the recipient to use said email address for the recipient transactions described herein.

A recipient module operating on the device 112 reads the data entered and transmits it to the server 102. In the course of enrolling or registering, the host 111 may enter any data 202 that may be stored in a host record into his device 131, as defined above. A host module operating on the device 131 reads the data entered and transmits it to the server 102. Also in the course of enrolling or registering, the server 102 may generate a user record and/or host record for each registering user/host and store the user/host record in an attached database, such as database 104. In one embodiment, any data transmitted to server 102 and stored in database will not include identifying data about the recipient, so as to maintain anonymity.

The process continues with step 304 wherein the web server 102 reads the data transmitted by the recipient modules and/or the host module in the previous step 302. In step 306, the web server 102 processes the electronic payment data. In step 306, the web server 102 processes the electronic payment information (as data 210) of user 132 for package delivery services with a payment gateway 190, over the communications network. In one embodiment, the recipient may choose a free option to use the package delivery services described herein. The recipient may choose a free option for hosting services, depending on the nature of the relationship between the participants.

In step 308, the web server 102 searches the database 104 among the plurality of host records for the particular host record having data that best matches the data transmitted by the recipient module. The server 102 may match one or more of the following: a geographic location of the recipient with a geographic location of the host, the recipient delivery preference with the host delivery ability, the rating preferred by the recipient with the rating of the host, the rating preferred by the host with the rating of the recipient, etc. In one embodiment, any electronic payment information processed by server 102 will not include identifying data about the recipient, so as to maintain anonymity.

Next, in step 310, the web server 102 instantiates a delivery process for a package destined for the recipient 132. The delivery process is described in more detail below with respect to the use of unmanned aerial drones and unmanned ground vehicles. In step 312, the web server 102 transmits a unique anonymous identifier, over the communications network 106, to the recipient module on the recipient computing device 112 (via data 208) and the host module on the host computing device 111, wherein the unique anonymous identifier corresponds to the delivery process (as data 206). The recipient 132 will use this identifier to pick up his package without providing any identifying information about the recipient, such as name, photograph, address, social security number, etc. Note that in steps 310 and 312, no identifying data about the recipient is used or allowed, so as to maintain anonymity of the recipient.

Next, in step 314, the web server 102 directs the delivery process to deliver the package to the delivery preference of the recipient 132. For example, the web server 102 may direct the delivery process to deliver the package to the host location of the host, wherein the recipient must display the unique anonymous identifier to retrieve the package from the host at the host location 381. In this alternative, the recipient 132 must travel to the host location 381 and display the unique anonymous identifier to retrieve the package from the host. In this alternative, the recipient 132 need not reveal his identity when retrieving the package, which maintains his anonymity and reduces or eliminates any embarrassment of having his identity associated with the package. The delivery process is described in more detail below with respect to the use of unmanned aerial drones and unmanned ground vehicles.

Alternatively, the web server 102 may direct the delivery process to deliver the package to a third-party location 390 defined by the recipient 132. In this alternative, the recipient 132 must travel to the location 390 and display the unique anonymous identifier to retrieve the package from the host. In this alternative, the recipient 132 need not reveal his identity when retrieving the package, which maintains his anonymity and reduces or eliminates any embarrassment of having his identity associated with the package.

Alternatively, the web server 102 may direct the delivery process to deliver the package to the address or location 398 of the recipient, as defined by the recipient 132. In this alternative, the host 111 must travel to the location 398 and ask the recipient 132 to display the unique anonymous identifier to retrieve the package from the host. Again, the recipient 132 need not reveal his identity when retrieving the package.

After delivery of the package has occurred, either or both parties may confirm this fact by entering a confirmation into the recipient module and/or the host modules and transmitting said confirmation to the server 102. Next, the web server 102 processes payment to the host by using the electronic payment information of the host for package delivery services with a payment gateway 190, over the communications network. In one embodiment, hosts in suburbs or buildings in cities can use equipped rooftops to receive deliveries on drone pads with printed barcode or code scannable by drone from the air to recognize the needed address.

In one embodiment, to ensure complete recipient anonymity, an application on device 112 will generate a unique identifier and a pair of public/private cryptographic keys for every new package that the recipient wishes to receive. At the initial package registration, the unique identifier and the public key will be sent to the server 102 and stored there. For all subsequent communications with the server 102, the mobile application on device 112 will identify itself with the unique identifier, and sign the requests with the private key to ensure security. In a similar way, when the package registration request is sent to the host, it will be identified with the unique identifier and the public key, and all messages between the recipient and the host will be identified by the unique identifier and encrypted by the public key to maintain the security of the communication.

When the recipient arrives at the host location to receive the package, to verify that the device 112 is the same device from which the original package request was sent, a scannable QR code, identified with the unique identifier and encrypted by the public key will be shown on the host device 131. The recipient scans the QR code using his device 112, and if the private key stored on the device 112 is able to decode the QR code, then an acceptance or an "OK" is displayed on the device. This gives the host the authorization to release the package to the recipient. The described procedure protects the host from handing the package to anyone other than the recipient who owns the device 112 that initiated the original package request.

Additionally, a face identifying option may be used. If a recipient wishes to be identified by a face picture, instead of a phone number or unique identifier. In this case, the host's device 131 will compare the persons face picture using a face identifying option to his/her face at the time of pick up.

Figure 3C:
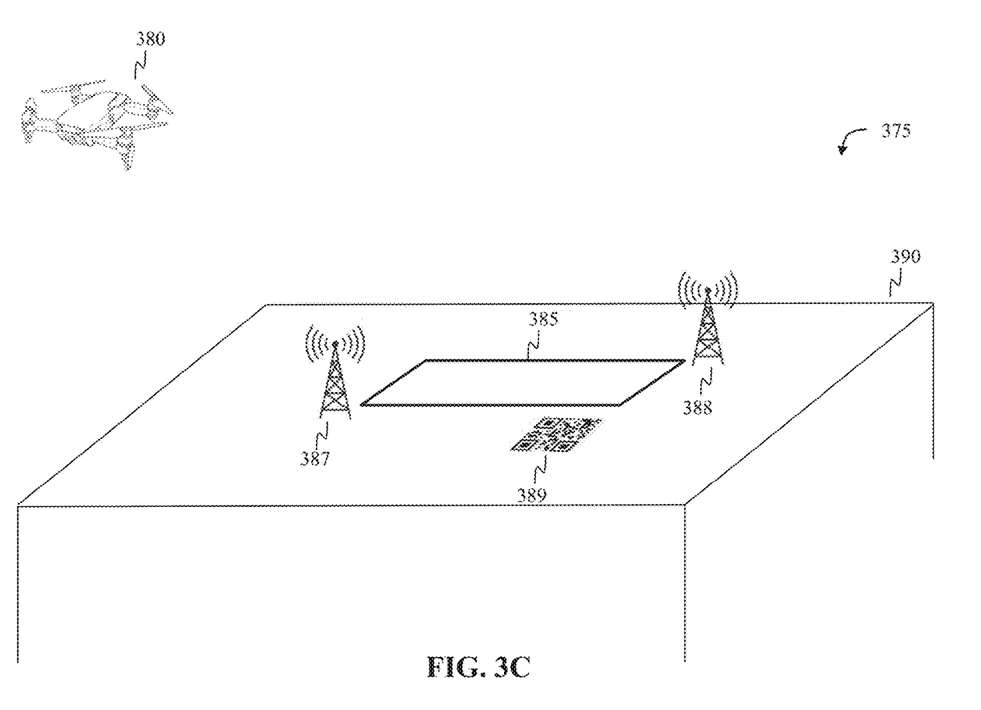
FIG. 3C is a block diagram depicting a drone delivery process for facilitating package delivery services over a communications network, according to one embodiment.

FIG. 3C is a block diagram 375 depicting a drone delivery process for facilitating package delivery services over a communications network, according to one embodiment. The drone delivery process may rely on existing Global Navigation Satellite System (GNSS) based systems such as Google (or similar). Server 102 tasks, commands or orders the aerial drone 380 to travel to the destination address. The drone 380 is an unmanned aerial vehicle (UAV), or an aircraft without a human pilot on board and a type of unmanned vehicle. UAVs are a component of an unmanned aircraft system, which include a UAV, a ground-based controller, and a system of communications between the two. The UAV includes a body, a power supply and platform (such as lithium-polymer batteries), UAV computing capability, UAV actuators (including digital electronic speed controllers that control the RPM of the motors linked to motors/engines and propellers), software (including real time systems for flying the aircraft), etc. The UAV may be an open loop or a closed loop control architecture. The UAV may further include a communications system include a radio for remote control and exchange of video and other data. The UAV may further include bi-directional narrowband radio links for carrying command and control and telemetry data about the status of aircraft systems to a remote operator.

The drone 380 may be equipped with cameras that have code reading capabilities (such as QR codes), and/or scanners that that can scan and read codes from a distance. Said cameras may also be configured to read addresses, street signs, traffic signals and other signage, so as to be able to find addresses on or near the ground. The drone 380 may further be equipped with one or more directional antennas for use in detecting the location of radio beacons 387, 388. A directional antenna or beam antenna is an antenna which radiates or receives greater power in specific directions allowing increased performance and reduced interference from unwanted sources. A high-gain antenna (HGA) is a directional antenna with a focused, narrow radiowave beam width, permitting more precise targeting of the radio signals. Each host location 390 registered for aerial drone delivery includes a landing pad 385 with a code (such as QR code 389 that, when processed or unencrypted, may reveal the host address) that is visible to the drone from a distance.

A radio beacon is a kind of beacon, a device that marks a fixed location and allows direction-finding equipment to find relative bearing. Radio beacons transmit a radio signal that is picked up by radio direction-finding systems on drone vehicles to determine the direction to the beacon. A radio beacon is a transmitter at a known location and transmits a continuous or periodic radio signal with limited information (for example, its identification or location) on a specified radio frequency. The beacon's transmission may include other information, such as telemetric or meteorological data. A non-directional beacon is a simple low and medium-frequency transmitter used to locate with the use of a radio direction finder located on the aircraft.

Note that the drone delivery process is autonomous and as soon as the web server 102 directs the delivery process to deliver the package to the delivery preference of the recipient 132 in step 314, the drone 380 beings its flight and operates on its own with requiring any input or direction from the server 102. The process by which drone 380 is tasked or commanded (by server 102) to deliver a package to a destination or building 390 is as follows. Initially, the drone is provided with a recipient address, which may include a street address and global location coordinates. The first phase of the flight will entail the use of a GNSS navigation system on the drone 380 wherein said system is used to autonomously arrive at a location near the destination 390. The drone then turns to the second phase of the flight which entails the use of a directional antenna on the drone 380 wherein said antenna is used to listen to transmissions from the radio beacons 387, 388 to travel even closer to the destination 390. The drone then turns to the third phase of the flight which entails the use of a camera or scanner on the drone 380 wherein said camera or scanner is used to pinpoint a precise landing spot (i.e., pad 385) by reading code 389 printed on the pad or near it.

In one embodiment, the radio beacons 387, 388 may interface with user's smartphone 112. The user 132 may travel to the exact location of the destination (i.e., rooftop of the building 390), places the beacon(s) there, uses their smartphone to identify the global coordinates of the location of the destination, and transmits said information to the beacons(s). The radio beacons 387, 388 may then transmit said location data when they are in operation.

The radio beacons 387, 388 may transmit a unique identifier of the destination location (rooftop of building 390) on a pre-defined radio frequency. The unique identifier is transmitted in the form of a string, consisting of the full address of the destination location, in the same format as the host's registered delivery address, shared by the host to the users.

In one embodiment, the process by which drone 380 travels to the destination or building 390 involves the use of visual navigation. The drone will be navigated by an onboard computer system, which uses the camera installed on the drone and scans the vicinity of the drone for the code 389, which is located at the correct destination. When a matching code is identified by the camera, the onboard computer system will guide the drone to drop the package on the adjacent pad 385.

In one embodiment, the process by which drone 380 travels to the destination or building 390 involves the use of navigation using the GNSS. As explained above, the beacon(s) can broadcast their precise global location (such as global coordinates) as the drone approaches.

In one embodiment, the process by which drone 380 travels to the destination or building 390 involves the use of triangulation or trilateration, which requires that the drone receives transmissions from three or more beacons located at or near the destination.

In one embodiment, in a case where drone 380 is tasked to deliver to a remote location that has no official address at all (such as a point in the mountains, or other remote location), drone 380 will rely on destination coordinates (such as longitude and latitude) and beacons to find the destination.

In one alternative embodiment, in lieu of a drone 380, ground delivery may be accomplished by unmanned ground vehicles equipped with gear similar to that of the drone 380, including cameras capable reading of building addresses and QR codes. In this embodiment, QR codes or other unique codes posted on the face of a building or home (or gate, door, wall, etc.) and said codes would be readable by the unmanned ground vehicle. A recipient or person at the destination could retrieve the package from the vehicle. The unmanned ground delivery vehicles are configured to find and recognize addresses autonomously. Vendors may sell products from said unmanned vehicles to residents and occupants, such as food and beverage delivery, pharmacy delivery, etc.

Figure 4:
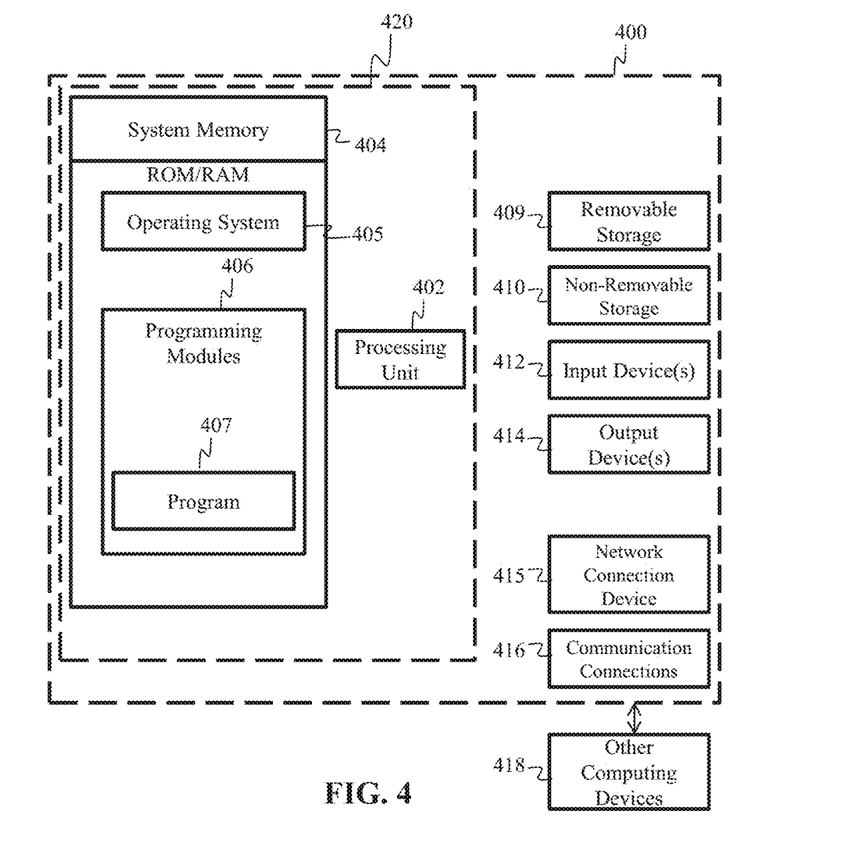
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 131, 112, 102 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process 300, as described above. Process 300 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of 131, 112, 102. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A networked system for facilitating package delivery services, the system comprising:
   a) a recipient module executing on a recipient computing device communicably connected to a communications network, the recipient module, belonging to a recipient, configured for:
      1) transmitting, over the communications network, to a web server the following data: recipient delivery preference and electronic payment information for package delivery services, wherein the recipient delivery preference indicates a host location, wherein said data does not include any identifying data about the recipient, further wherein the recipient module generates a unique and anonymous email address for the recipient for use with recipient transactions;
      2) generating a public cryptographic key and a private cryptographic key for each new package for the recipient;
      3) transmitting the public cryptographic key to a web server module executing on the web server and to a host module executing on a host computing device;
   b) the host module executing on the host computing device communicably connected to the communications network, the host module, belonging to a host, configured for:
      1) transmitting, over the communications network, the following data: host location, host delivery ability, an email address and/or telephone number, and electronic payment information for receiving payment;
   c) a database communicably connected to the communications network, the database including a plurality of user records and a plurality of host records, the database configured for storing the data transmitted by the recipient module in a particular user record, and storing the data transmitted by the host module in a particular host record;
   d) the web server module executing on the web server communicably connected to the communications network, the web server module configured for:
      1) reading the data transmitted by the recipient module;
      2) processing the electronic payment information for package delivery services with a payment gateway, over the communications network;
      3) searching the database among the plurality of host records for the particular host record having data that best matches the data transmitted by the recipient module, wherein the particular host record further comprises a rating associated with the host;
      4) instantiating a delivery process for a package destined for the recipient;
      5) transmitting a unique anonymous identifier for each new package for the recipient, over the communications network, to the recipient module on the recipient computing device and the host module on the host computing device, wherein the unique anonymous identifier corresponds to the delivery process;
      6) directing the delivery process to deliver the package to the host location of the host, wherein the recipient must display the unique anonymous identifier to retrieve the package from the host at the host location, wherein the host is authorized to release the package to the recipient if a scannable QR code on the host device is decoded with the private cryptographic key stored on the recipient device;
      7) tasking an aerial delivery drone with delivering the package to the host location including providing the aerial delivery drone with global coordinates for the host location;
   e) the aerial delivery drone configured to travel while carrying the package to the host location, the aerial delivery drone including at least a GNSS navigation system for navigating to the host location, a directional antenna configured for direction finding one or more radio beacons, and a camera configured for reading a printed unique code;
   f) an aerial delivery drone landing pad located at the host location, the aerial delivery drone landing pad configured for accepting landing of the aerial delivery drone carrying the package, and the aerial drone landing pad including a printed unique code corresponding to the host location;
   g) one or more radio beacons located at the host location, the one or more radio beacons configured for transmitting a code corresponding to the host location;
   h) wherein the aerial delivery drone autonomously navigates toward the host location using the GNSS navigation system, navigates toward the host location using the directional antenna direction finding the one or more radio beacons, and navigates toward the host location using the camera and reading the printed unique code on the aerial delivery drone landing pad.

2. The system of claim 1, wherein the step of transmitting, over the communications network, the following data: recipient delivery preference and electronic payment information for package delivery services to the web server, wherein the recipient delivery preference indicates a host location, further comprises transmitting an HTTP request to a web server.

3. The system of claim 2, wherein the step of transmitting, over the communications network, to the web server the following data: host location, an email address and/or telephone number, and electronic payment information for receiving payment, further comprises transmitting an HTTP request to the web server.

4. The system of claim 3, wherein electronic payment information comprises credit card information.

5. The system of claim 4, wherein the step of searching the database among the plurality of host records for the particular host record having data that best matches the data transmitted by the recipient module further comprises of matching a geographic location of the recipient with a geographic location of the host and further comprises of matching recipient delivery preference with host delivery ability.

6. A networked system for facilitating package delivery services, the system comprising:
   a) a recipient module executing on a recipient computing device communicably connected to a communications network, the recipient module, belonging to a recipient, configured for:
      1) transmitting, over the communications network, to a web server the following data: recipient delivery preference and electronic payment information for package delivery services, wherein the recipient delivery preference indicates a host location; wherein said data does not include any identifying data about the recipient, further wherein the recipient module generates a unique and anonymous email address for the recipient for use with recipient transactions;

2) generating a public cryptographic key and a private cryptographic key for each new package for the recipient;
3) transmitting the public cryptographic key to a web server module executing on the web server and to a host module executing on a host computing device;

b) the host module executing on the host computing device communicably connected to the communications network, the host module, belonging to a host, configured for:
1) transmitting, over the communications network, to the web server the following data: host location, host delivery ability, an email address and/or telephone number, and electronic payment information for receiving payment;

c) a database communicably connected to the communications network, the database including a plurality of user records and a plurality of host records, the database configured for storing the data transmitted by the recipient module in a particular user record, and storing the data transmitted by the host module in a particular host record; and d) the web server module executing on the web server communicably connected to the communications network, the web server module configured for:
1) reading the data transmitted by the recipient module;
2) processing the electronic payment information for package delivery services with a payment gateway, over the communications network;
3) searching the database among the plurality of host records for the particular host record having data that best matches the data transmitted by the recipient module; wherein the particular host record further comprises a rating associated with the host;
4) instantiating a delivery process for a package destined for the recipient;
5) transmitting a unique anonymous identifier for each new package for the recipient, over the communications network, to the recipient module on the recipient computing device and the host module on the host computing device, wherein the unique anonymous identifier corresponds to the delivery process;
6) directing the delivery process to deliver the package to a third-party location, wherein the recipient must display the unique anonymous identifier to retrieve the package from the host at the third-party location, wherein the host is authorized to release the package to the recipient if a scannable QR code on the host device is decoded with the private cryptographic key stored on the recipient device;
7) tasking an aerial delivery drone with delivering the package to the host location including providing the aerial delivery drone with global coordinates for the host location;

e) the aerial delivery drone configured to travel while carrying the package to the host location, the aerial delivery drone including at least a GNSS navigation system for navigating to the host location, a directional antenna configured for direction finding one or more radio beacons, and a camera configured for reading a printed unique code;

f) an aerial delivery drone landing pad located at the host location, the aerial delivery drone landing pad configured for accepting landing of the aerial delivery drone carrying the package, and the aerial drone landing pad including a printed unique code corresponding to the host location;

g) one or more radio beacons located at the host location, the one or more radio beacons configured for transmitting a code corresponding to the host location;

h) wherein the aerial delivery drone autonomously navigates toward the host location using the GNSS navigation system, navigates toward the host location using the directional antenna direction finding the one or more radio beacons, and navigates toward the host location using the camera and reading the printed unique code on the aerial delivery drone landing pad.

7. The system of claim 6, wherein the step of transmitting, over the communications network, to a web server the following data: recipient delivery preference and electronic payment information for package delivery services to the web server, wherein the recipient delivery preference indicates a host location, further comprises transmitting an HTTP request to a web server.

8. The system of claim 7, wherein the step of transmitting, over the communications network, to the web server the following data: host location, an email address and/or telephone number, and electronic payment information for receiving payment, further comprises transmitting an HTTP request to the web server.

9. The system of claim 8, wherein electronic payment information comprises credit card information.

10. The system of claim 9, wherein the step of searching the database among the plurality of host records for the particular host record having data that best matches the data transmitted by the recipient module further comprises of matching a geographic location of the recipient with a geographic location of the host and further comprises of matching recipient delivery preference with host delivery ability.

11. A networked system for facilitating package delivery services, the system comprising:

a) a recipient module executing on a recipient computing device communicably connected to a communications network, the recipient module, belonging to a recipient, configured for:
1) transmitting, over the communications network, to a web server the following data: recipient delivery preference and electronic payment information for package delivery services, wherein the recipient delivery preference indicates a host location; wherein said data does not include any identifying data about the recipient, further wherein the recipient module generates a unique and anonymous email address for the recipient for use with recipient transactions;
2) generating a public cryptographic key and a private cryptographic key for each new package for the recipient;
3) transmitting the public cryptographic key to a web server module executing on the web server and to a host module executing on a host computing device;

b) the host module executing on the host computing device communicably connected to the communications network, the host module, belonging to a host, configured for:
1) transmitting, over the communications network, to the web server the following data: host location, host delivery ability, an email address and/or telephone number, and electronic payment information for receiving payment;

c) a database communicably connected to the communications network, the database including a plurality of user records and a plurality of host records, the database configured for storing the data transmitted by the recipient module in a particular user record, and storing the data transmitted by the host module in a particular host record; and d) the web server module executing on the web server communicably connected to the communications network, the web server module configured for:

1) reading the data transmitted by the recipient module;
2) processing the electronic payment information for package delivery services with a payment gateway, over the communications network;
3) searching the database among the plurality of host records for the particular host record having data that best matches the data transmitted by the recipient module, wherein the particular host record further comprises a rating associated with the host;
4) instantiating a delivery process for a package destined for the recipient;
5) transmitting a unique anonymous identifier for each new package for the recipient, over the communications network, to the recipient module on the recipient computing device and the host module on the host computing device, wherein the unique anonymous identifier corresponds to the delivery process;
6) directing the delivery process to deliver the package to a geographic location specified by the recipient, wherein the recipient must display the unique anonymous identifier to retrieve the package from the host at the geographic location, wherein the host is authorized to release the package to the recipient if a scannable QR code on the host device is decoded with the private cryptographic key stored on the recipient device;
7) tasking an aerial delivery drone with delivering the package to the host location including providing the aerial delivery drone with global coordinates for the host location;

e) the aerial delivery drone configured to travel while carrying the package to the host location, the aerial delivery drone including at least a GNSS navigation system for navigating to the host location, a directional antenna configured for direction finding one or more radio beacons, and a camera configured for reading a printed unique code;

f) an aerial delivery drone landing pad located at the host location, the aerial delivery drone landing pad configured for accepting landing of the aerial delivery drone carrying the package, and the aerial drone landing pad including a printed unique code corresponding to the host location;

g) one or more radio beacons located at the host location, the one or more radio beacons configured for transmitting a code corresponding to the host location;

h) wherein the aerial delivery drone autonomously navigates toward the host location using the GNSS navigation system, navigates toward the host location using the directional antenna direction finding the one or more radio beacons, and navigates toward the host location using the camera and reading the printed unique code on the aerial delivery drone landing pad.

12. The system of claim 11, wherein the step of transmitting, over the communications network, to a web server the following data: recipient delivery preference and electronic payment information for package delivery services to the web server, wherein the recipient delivery preference indicates a host location, further comprises transmitting an HTTP request to a web server.

13. The system of claim 12, wherein the step of transmitting, over the communications network, to the web server the following data: host location, an email address and/or telephone number, and electronic payment information for receiving payment, further comprises transmitting an HTTP request to the web server.

14. The system of claim 13, wherein electronic payment information comprises credit card information.

15. The system of claim 14, wherein the step of searching the database among the plurality of host records for the particular host record having data that best matches the data transmitted by the recipient module further comprises of matching a geographic location of the recipient with a geographic location of the host and further comprises of matching recipient delivery preference with host delivery ability.

* * * * *